US008958283B2

(12) United States Patent
Bonneville et al.

(10) Patent No.: US 8,958,283 B2
(45) Date of Patent: Feb. 17, 2015

(54) METHOD AND A DEVICE FOR ENABLING A MOBILE TERMINAL TO ACCESS TO A WIRELESS CELLULAR TELECOMMUNICATION NETWORK

(75) Inventors: Herve Bonneville, Rennes Cedex 7 (FR); Loic Brunel, Rennes Cedex 7 (FR); Nicolas Gresset, Rennes Cedex 7 (FR); Mourad Khanfouci, Rennes Cedex 7 (FR)

(73) Assignee: Mitsubishi Electric Corporation, Tokyo (JP)

( * ) Notice: Subject to any disclaimer, the term of this patent is extended or adjusted under 35 U.S.C. 154(b) by 794 days.

(21) Appl. No.: 13/062,803

(22) PCT Filed: Sep. 16, 2009

(86) PCT No.: PCT/EP2009/062026
§ 371 (c)(1),
(2), (4) Date: Mar. 8, 2011

(87) PCT Pub. No.: WO2010/031796
PCT Pub. Date: Mar. 25, 2010

(65) Prior Publication Data
US 2011/0170490 A1    Jul. 14, 2011

(30) Foreign Application Priority Data
Sep. 22, 2008   (EP) .................................... 08164793

(51) Int. Cl.
*H04W 24/04*   (2009.01)

(52) U.S. Cl.
CPC .................................... *H04W 24/04* (2013.01)
USPC ............ 370/221; 370/329; 370/331; 455/434

(58) Field of Classification Search
CPC ..... H04W 36/08; H04W 36/04; H04W 24/04; H04W 48/20

USPC ........... 370/216–221, 328–329, 331; 455/434
See application file for complete search history.

(56) References Cited

U.S. PATENT DOCUMENTS

| 5,640,677 A * | 6/1997 | Karlsson ........................ 455/434 |
| 6,201,958 B1 * | 3/2001 | Boucher ........................ 455/411 |

(Continued)

FOREIGN PATENT DOCUMENTS

JP    2004 179909    6/2004

OTHER PUBLICATIONS

International Search Report issued Oct. 19, 2009 in PCT/EP09/062026 filed Sep. 16, 2009.

(Continued)

*Primary Examiner* — Un C Cho
*Assistant Examiner* — Siming Liu
(74) *Attorney, Agent, or Firm* — Oblon, Spivak, McClelland, Maier & Neustadt, L.L.P.

(57) ABSTRACT

A method for enabling a mobile terminal to access to a wireless cellular telecommunication network including plural base stations, the mobile terminal having right to access to the wireless cellular telecommunication network through a first base station, the mobile terminal having no right to access to the wireless cellular telecommunication network through a second base station. The method includes: detecting reception of a message transferred by the mobile terminal to the second base station, determining if the first base station is operational, giving right to the mobile terminal to access to the wireless cellular telecommunication network through the second base station if the first base station is not operational, and rejecting right to the mobile terminal to access to the wireless cellular telecommunication network through the second base station if the first base station is operational.

9 Claims, 6 Drawing Sheets

(56) References Cited

U.S. PATENT DOCUMENTS

| | | | |
|---|---|---|---|
| 6,609,003 B1* | 8/2003 | Park et al. | 455/436 |
| 6,724,731 B1 | 4/2004 | Shibasaki et al. | |
| 2002/0115442 A1* | 8/2002 | Dorenbosch | 455/446 |
| 2004/0136318 A1* | 7/2004 | Bentley | 370/221 |
| 2008/0137853 A1* | 6/2008 | Mizikovsky et al. | 380/247 |

OTHER PUBLICATIONS

U.S. Appl. No. 13/061,883, filed Mar. 2, 2011, Brunel, et al.

* cited by examiner

METHOD AND A DEVICE FOR ENABLING A MOBILE TERMINAL TO ACCESS TO A WIRELESS CELLULAR TELECOMMUNICATION NETWORK

The present invention relates generally to a method and a device for enabling a mobile terminal to access to a wireless cellular telecommunication network comprising plural base stations.

Wireless cellular telecommunication networks are largely deployed but they are still some areas not covered by the base stations of the wireless cellular telecommunication network.

For example, the access to the wireless cellular telecommunication network is not possible for a mobile terminal located in a building, the signals radiated by the base stations being too attenuated.

Solutions are proposed today. Particular base stations, like home base stations or femto base stations provide coverage areas within the buildings.

These base stations enable a limited number of mobile terminals to access to the wireless cellular telecommunication network through their respective resources in order to maintain their quality of service. The terminals allowed to access the resources of the network may be determined by the holder of the base station, the network or a combination of both.

For example, only mobile terminals of the holder of the home base station and its family can access to the wireless cellular telecommunication network through the home base station. These mobile terminals are associated to the home base station. Other mobile terminals can not access to the wireless cellular telecommunication network through the home base station. These mobile terminals are not associated to the home base station.

When a home base station is not operational, for example when the base station is powered off, broken, or disconnected from the telecommunication network, the mobile terminal which is associated to the base station can not access to the wireless cellular telecommunication network through another home base station as the mobile terminal is not allowed to access to the wireless cellular telecommunication network through the other home base station.

If the mobile terminal attempts to access to the wireless cellular telecommunication network through the other home base station, the wireless cellular telecommunication network rejects the mobile terminal as there is no relationship between the terminal and the other base station.

The present invention aims at allowing a mobile terminal which is associated to a base station like a home base station to get access to the wireless cellular telecommunication network even if the base station it is associated with is not operational.

To that end, the present invention concerns a method for enabling a mobile terminal to access to a wireless cellular telecommunication network comprising plural base stations, the mobile terminal having right to access to the wireless cellular telecommunication network through a first base station, the mobile terminal having no right to access to the wireless cellular telecommunication network through a second base station, characterised in that the method comprises the steps of:
  detecting the reception of a message transferred by the mobile terminal to the second base station,
  determining if the first base station is operational,
  giving right to the mobile terminal to access to the wireless cellular telecommunication network through the second base station if the first base station is not operational,
  rejecting right to the mobile terminal to access to the wireless cellular telecommunication network through the second base station if the first base station is operational.

The present invention concerns also a device for enabling a mobile terminal to access to a wireless cellular telecommunication network comprising plural base stations, the mobile terminal having right to access to the wireless cellular telecommunication network through a first base station, the mobile terminal having no right to access to the wireless cellular telecommunication network through a second base station, characterised in that the device for enabling a mobile terminal to access to a wireless cellular telecommunication network comprises:
  means for detecting the reception of a message transferred by the mobile terminal to the second base station,
  means for determining if the first base station is operational,
  means for giving right to the mobile terminal to access to the wireless cellular telecommunication network through the second base station if the first base station is not operational,
  means for rejecting right to the mobile terminal to access to the wireless cellular telecommunication network through the second base station if the first base station is operational.

Thus, the mobile terminal can access to the wireless cellular telecommunication network even if the first base station is not operational.

Furthermore, by enabling the mobile terminal to access to the wireless cellular telecommunication network through the second base station only when the first base station is not operational, the access to the wireless cellular telecommunication network through the second base station is limited to particular conditions.

According to a particular feature, the right to access to the wireless cellular telecommunication network through the second base station is given to the mobile terminal if the second base station is located in the vicinity of the first base station.

Thus, by enabling the mobile terminal to access to the wireless cellular telecommunication network through the second base station if the second base station is located in the vicinity of the first base station, the access to the wireless cellular telecommunication network through the second base station is limited to particular conditions.

According to a particular feature, the right to access to the wireless cellular telecommunication network through the second base station is given to the mobile terminal for a limited period of time.

Thus, by enabling the mobile terminal to access to the wireless cellular telecommunication network through the second base station for a limited period of time, the access to the wireless cellular telecommunication network through the second base station is limited to particular conditions.

According to a particular feature, the wireless cellular telecommunication network comprises a core network device and in that the method is executed by the core network device.

Thus, the burden put on the second base station is limited.

According to a particular feature, the mobile terminal is able to access to the wireless cellular telecommunication network through plural first base stations and the method comprises further step of determining which first base station is not operational, the first base station being determined by reading information identifying the first base station in the message received from the second base station or by using information representative of the vicinity between the first base station and the second base station which transferred the message.

Thus, the access right is selective and the mobile terminal gets access right only to second base stations located in the neighbourhood of the first base station.

According to a particular feature, the method is executed by the second base station.

Thus, load is distributed among base stations and the impact on the core network is limited.

According to still another aspect, the present invention concerns a method for enabling a mobile terminal to access to a wireless cellular telecommunication network comprising plural base stations, the mobile terminal having right to access to the wireless cellular telecommunication network through a first base station, the mobile terminal having no right to access to the wireless cellular telecommunication network through a second base station, the mobile terminal memorizing information identifying the first base station, characterised in that the method comprises the steps executed by the mobile terminal of:

checking if signals that may be transferred by the first base station are received,
   measuring signals transferred by the second base station,
   transferring a message to the second base station if the signals that may be transferred by the first base station are not received and the signals transferred by the second base station are received,
   receiving a message from the second base station, the message giving right to access to the wireless cellular telecommunication network through the second base station,
   memorizing information representative of the right of the mobile terminal to access to the wireless cellular telecommunication network through the second base station,
   accessing to the wireless cellular telecommunication network through the second base station.

The present invention concerns also a device for enabling a mobile terminal to access to a wireless cellular telecommunication network comprising plural base stations, the mobile terminal having right to access to the wireless cellular telecommunication network through a first base station, the mobile terminal having no right to access to the wireless cellular telecommunication network through a second base station, the mobile terminal memorizing information identifying the first base station, characterised in that the device for enabling a mobile terminal to access to a wireless cellular telecommunication network is included in the mobile terminal and comprises:

means for checking if signals that may be transferred by the first base station are received,
   means for measuring signals transferred by the second base station,
   means for transferring a message to the second base station if the signals that may be transferred by the first base station are not received and the signals transferred by the second base station are received,
   means for receiving a message from the second base station, the message giving right to access to the wireless cellular telecommunication network through the second base station,
   means for memorizing information representative of the right of the mobile terminal to access to the wireless cellular telecommunication network through the second base station,
   means for accessing to the wireless cellular telecommunication network through the second base station.

Thus, the mobile terminal can access to the wireless cellular telecommunication network even if the first base station is not operational.

Furthermore, by enabling the mobile terminal to access to the resources of the second base station only when the first base station is not operational, the access to the second base station is limited to particular conditions.

According to a particular feature, the mobile terminal has right to access to the wireless cellular telecommunication network through plural first base stations and the method comprises further step of determining which first base station is not operational, the first base station being determined using information representative of the vicinity between the first base station and the second base station to which the message is transferred.

Thus, the access right is selective and the mobile terminal gets access right only to second base stations located in the neighbourhood of the first base station.

According to a particular feature, plural second base stations transfer signals and the second base station to which the message is transferred is the second base station which transfers the signals which are received with the highest signal level by the mobile terminal.

Thus, the service quality offered by the wireless cellular communication network is maintained.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and apparatuses according to the invention, they will not be repeated here.

The characteristics of the invention will emerge more clearly from a reading of the following description of an example embodiment, the said description being produced with reference to the accompanying drawings, among which.

Figure 1:
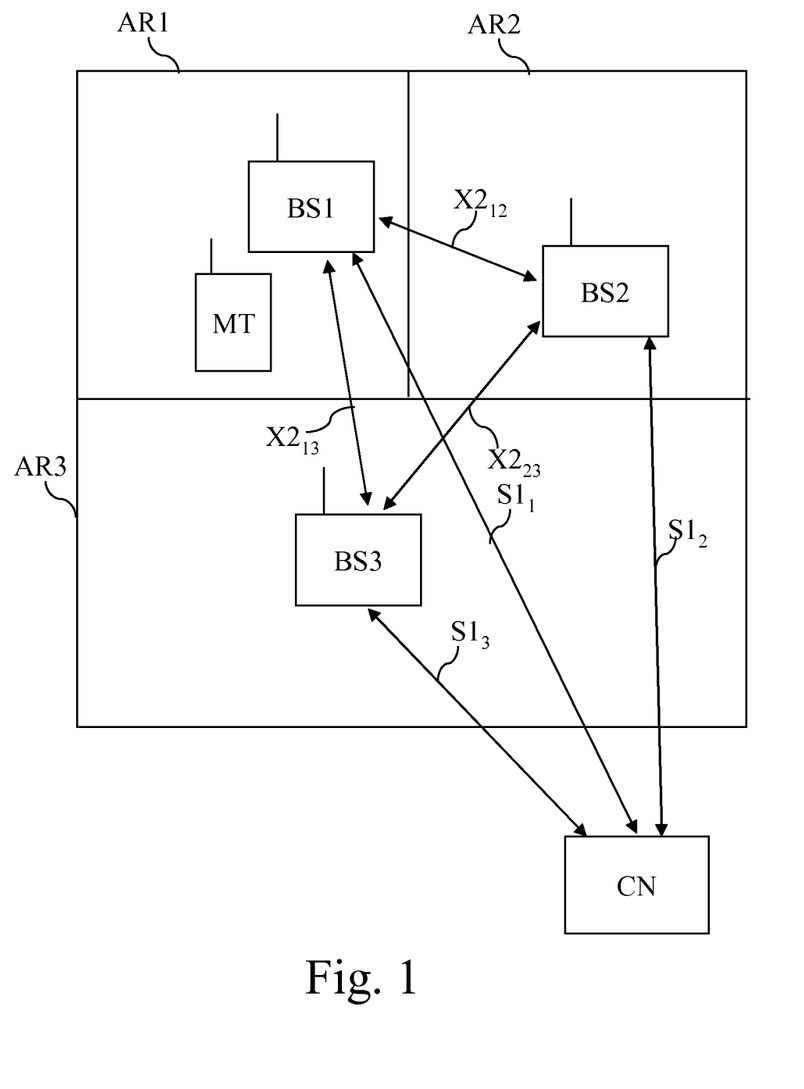
FIG. 1 represents a wireless cellular telecommunication network in which the present invention is implemented.

In the FIG. 1, three base stations BS1, BS2 and BS3 of a wireless cellular telecommunication network are shown.

The base stations BS1, BS2 and BS3 are for example femto base stations BS. Each base station BS is as example located into homes and enables mobile terminals MT which are allowed, i.e. associated to the base station BS, to access to the wireless cellular telecommunication network through the femto base station BS.

Classically, only the mobile terminal MT of the owner of a femto base station BS is allowed to access to the wireless cellular telecommunication network through the femto base station BS.

Mobile terminals, for example the one belonging to the family or friends of the owner of the base station BS may be allowed to access to the wireless cellular telecommunication network through the femto base station BS.

Other mobile terminals MT are not allowed to access to the wireless cellular telecommunication network through the base station BS and are not associated to the base station BS.

The base station BS1 is located in the area AR1 and gives right to the mobile terminal MT to access to the wireless cellular telecommunication through the base station BS1 as the mobile terminal MT is associated to the base station BS1. For example, the base station BS1 and the mobile terminal MT belong to the same owner.

The base station BS2 is located in the area AR2 and does not give right to the mobile terminal MT to access to the wireless cellular telecommunication network through the femto base station BS2 as the base station BS2 and the mobile terminal MT are not associated.

The base station BS3 is located in the area AR3 and does not give right to the mobile terminal MT to access to the wireless cellular telecommunication network through the femto base station BS3 as the base station BS3 and the mobile terminal MT are not associated.

The signals transferred by the base station BS1 are received by any mobile terminal MT located in the areas AR1, AR2 or AR3. The signals transferred by the base station BS2 are received by any mobile terminal MT located in the areas AR1, AR2 or AR3. The signals transferred by the base station BS3 are received by any mobile terminal MT located in the areas AR1, AR2 or AR3.

For example, the signals transferred by the base station BS2 and measured by the mobile terminal MT have a power level higher than the signals transferred by the base station BS3 and measured by the mobile terminal MT.

The areas AR1 to AR3 are for example apartments in a building.

The mobile terminal MT can then receive the signals transferred by the base stations BS1, BS2 and BS3.

Each base station base BS1 to BS3 is connected to a core network device CN of the wireless cellular telecommunication network through a telecommunication network not shown in the FIG. 1.

The base station BS1 is linked to the core network device CN through the link $S1_1$ established on the telecommunication network.

The base station BS2 is linked to the core network device CN through the link $S1_2$ established on the telecommunication network.

The base station BS3 is linked to the core network device CN through the link $S1_3$ established on the telecommunication network.

The base station BS1 may be linked to the base station BS2 through the link $X2_{12}$ established on the telecommunication network.

The base station BS1 may be linked to the base station BS3 through the link $X2_{13}$ established on the telecommunication network.

The base station BS2 may be linked to the base station BS3 through the link $X2_{23}$ established on the telecommunication network.

When the base station BS1 is not operational, for example when the base station BS1 is powered off, is broken, is in an operating mode wherein the base station BS1 does not transfer signals or is disconnected from the telecommunication network, the mobile terminal MT can not access to the wireless cellular telecommunication network through another base station BS2 or BS3 as the mobile terminal MT is not allowed to access to the wireless cellular telecommunication network through the base stations BS2 and BS3.

According to the invention, the base station BS2 and/or the core network device detects the reception of a message transferred by the mobile terminal MT to the base station BS2, determines if the base station BS1 is operational, gives right to the mobile terminal MT to access to the wireless cellular telecommunication network through the base station BS2 if the base station BS1 is not operational, refuses to give the right to the mobile terminal MT to access to the wireless cellular telecommunication network through the base station BS2 if the base station BS1 is operational.

When a mobile terminal MT accesses to the wireless cellular telecommunication network, the mobile terminal MT can establish or receive a communication with a remote telecommunication device and/or can download data and/or can notify the core network device CN that a base station BS identified in its list of at least one base station is not operational and/or can request the core network device CN to wake up the base station BS which is not operational.

Information identifying a base station BS may identify uniquely the base station BS among all the base stations BS of the wireless cellular telecommunication network or may identify uniquely the base station BS among a limited number of base stations BS of the wireless cellular telecommunication network, for example the base stations BS located within a given area.

Figure 2:
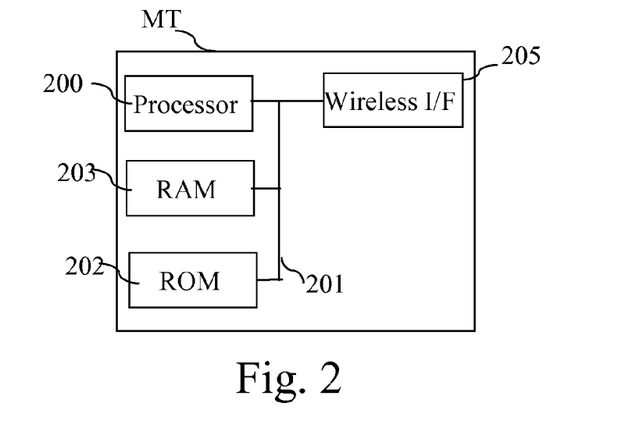
FIG. 2 is a diagram representing the architecture of a mobile terminal in which the present invention is implemented.

FIG. 2 is a diagram representing the architecture of a mobile terminal in which the present invention is implemented.

Figure 5:
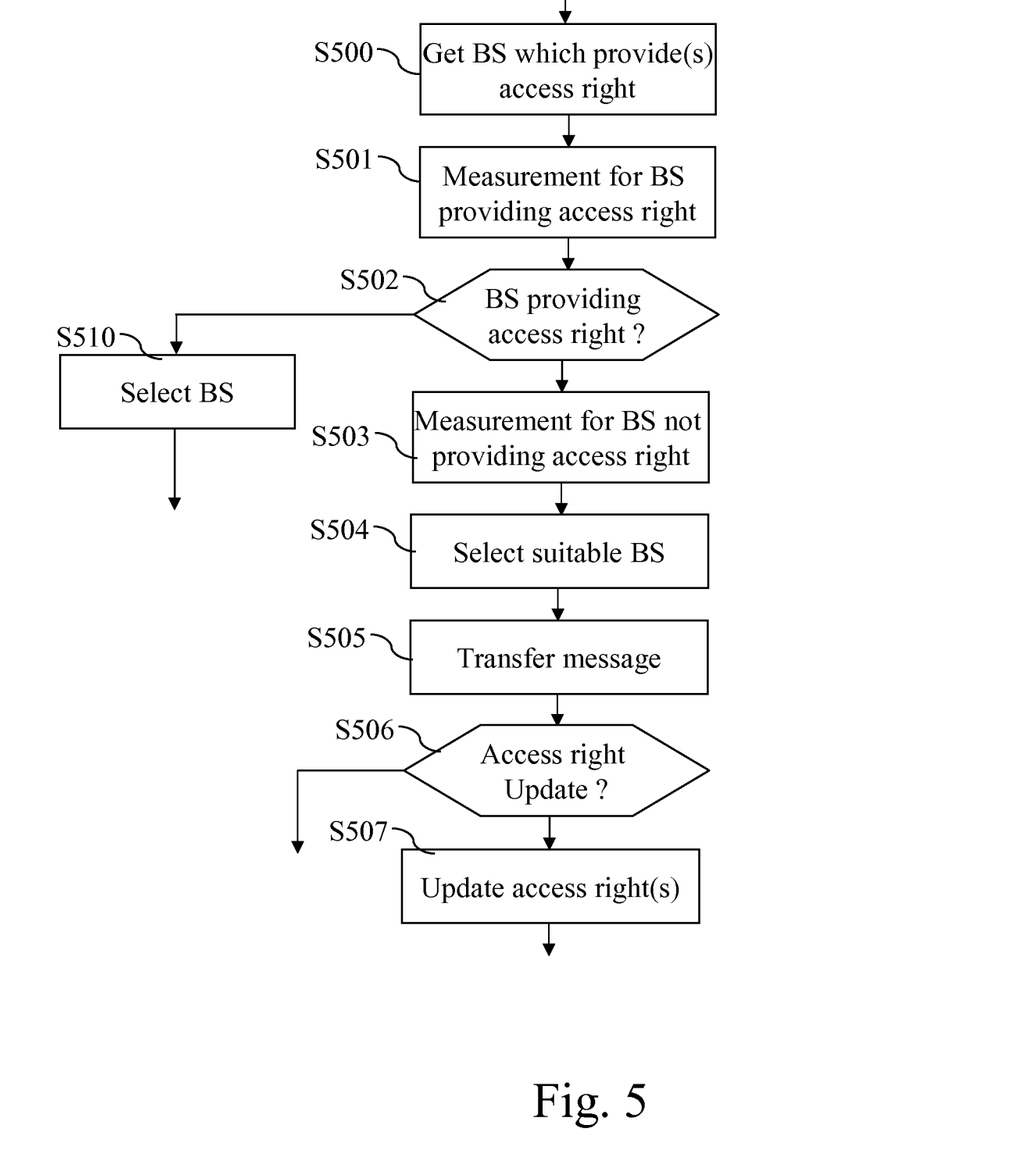
FIG. 5 discloses an example of an algorithm executed by a mobile terminal according to the present invention.

The mobile terminal MT has, for example, an architecture based on components connected together by a bus 201 and a processor 200 controlled by the program as disclosed in FIG. 5.

The bus 201 links the processor 200 to a read only memory ROM 202, a random access memory RAM 203 and a wireless interface 205.

The memory 203 contains registers intended to receive variables and the instructions of the program as disclosed in FIG. 5.

The memory 203 memorises a list of at least one base station BS through which the mobile terminal MT has right to access to the wireless cellular telecommunication network according to the present invention.

The memory 203 may memorise information representative of the position of the at least one base station BS identified in the list of at least one base station BS.

The memory 203 may memorise information representative of the neighbouring conditions of the base stations BS identified in the list of at least one base station BS.

The processor 200 controls the operation of the wireless interface 205.

The read only memory 202 contains instructions of the program as disclosed in the FIG. 5, which are transferred, when the mobile terminal MT is powered on, to the random access memory 203.

The wireless interface 205 enables the mobile terminal MT to transfer and/or receive signals or messages to/from the base stations BS.

The wireless interface 205 comprises means for measuring or detecting the signals transferred by the base stations BS.

The mobile terminal MT may comprise a Global Navigation Satellite System module not shown in the FIG. 2.

Figure 3:
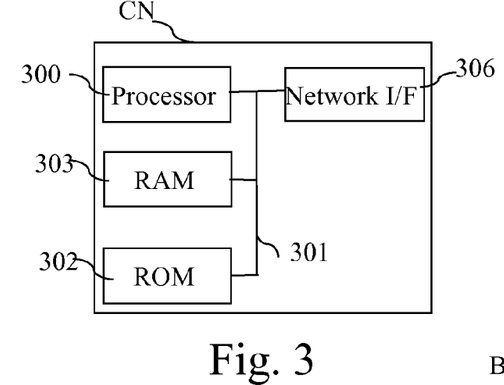
FIG. 3 is a diagram representing the architecture of a core network device in which the present invention is implemented.

FIG. 3 is a diagram representing the architecture of a core network device in which the present invention is implemented.

Figure 6:
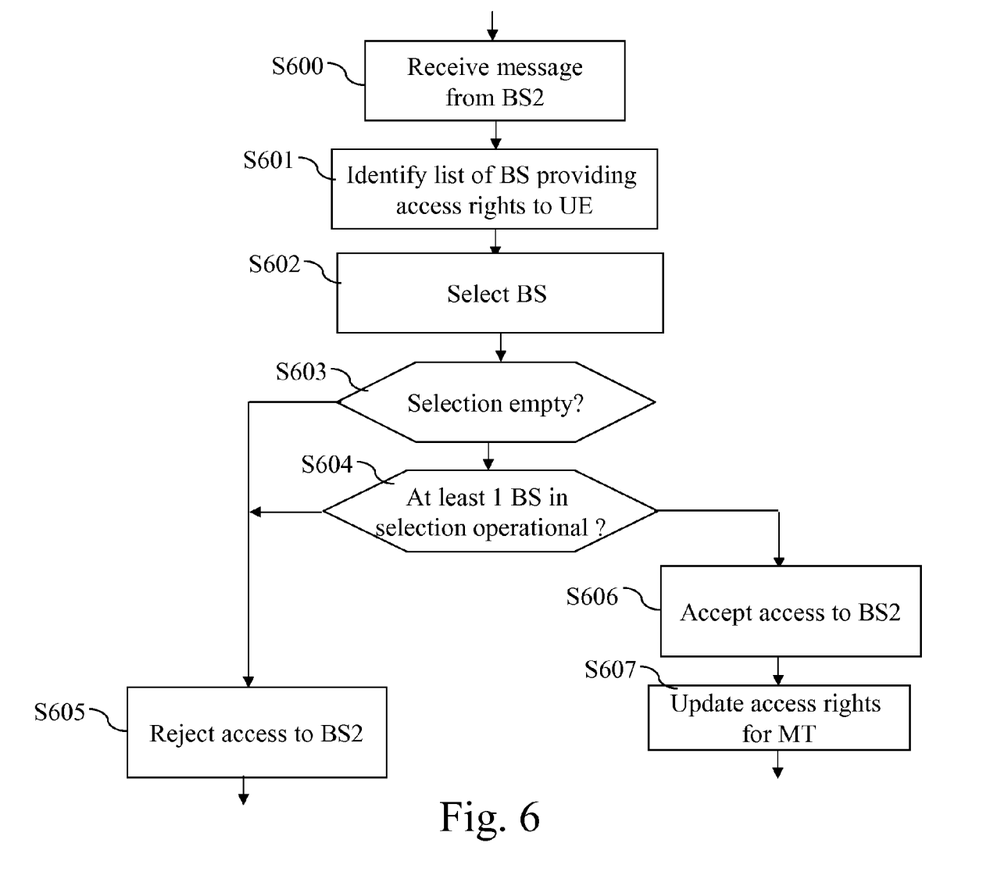
FIG. 6 discloses an example of an algorithm executed by a core network device according to a first mode of realisation of the present invention.
Figure 7A:
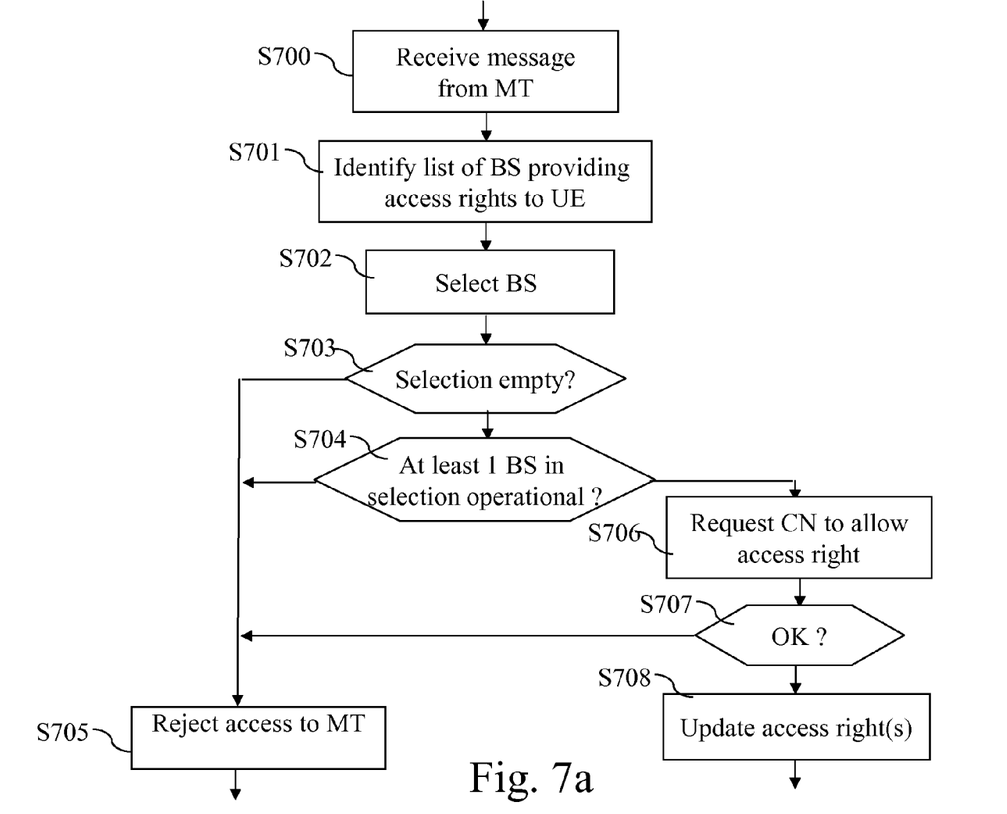
FIG. 7a discloses an example of an algorithm executed by a base station according to a second mode of realisation of the present invention.
Figure 7B:
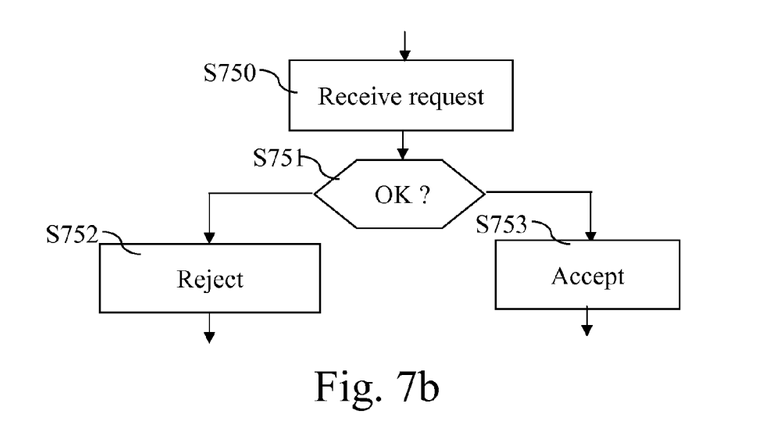
FIG. 7b discloses an example of an algorithm executed by a core network device according to the second mode of realisation of the present invention.

The core network device CN has, for example, an architecture based on components connected together by a bus 301 and a processor 300 controlled by the program as disclosed in the FIG. 6 or 7b.

The bus 301 links the processor 300 to a read only memory ROM 302, a random access memory RAM 303 and a network interface 306.

The memory 303 contains registers intended to receive variables and the instructions of the program related to the algorithm as disclosed in the FIG. 6 or 7b.

The memory 303 may comprise, for each mobile terminal MT, a list of at least one base station BS through which the mobile terminal MT has right to access to the wireless cellular telecommunication network according to the present invention.

The memory 303 may comprise information representative of the neighbouring conditions of the base stations BS.

The processor 300 controls the operation of the network interface 306.

The read only memory 302 contains instructions of the programs related to the algorithm as disclosed in the FIG. 6 or 7b, which are transferred, when the core network device CN is powered on, to the random access memory 303.

The core network device CN may be connected to a telecommunication network not shown in the FIG. 1 through the network interface 306. For example, the network interface 306 is a DSL (Digital Subscriber Line) modem, or an ISDN (Integrated Services Digital Network) interface, etc. Through such interface, the core network device CN may transfer or receive messages to at least one base station BS.

Messages are transferred through links 51 established on the telecommunication network between the core network device CN and the base stations BS.

Figure 4:
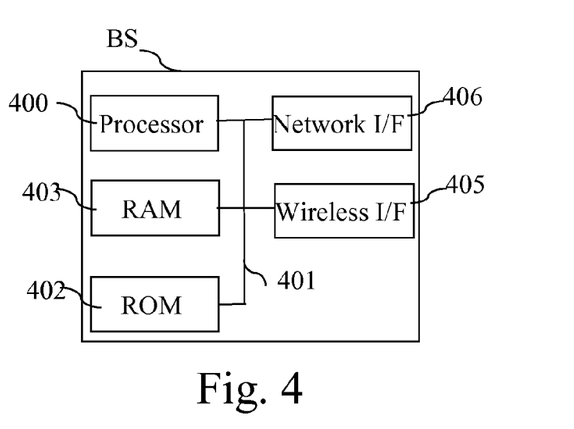
FIG. 4 is a diagram representing the architecture of a base station in which the present invention is implemented.

FIG. 4 is a diagram representing the architecture of a base station in which the present invention is implemented.

Figure 8:
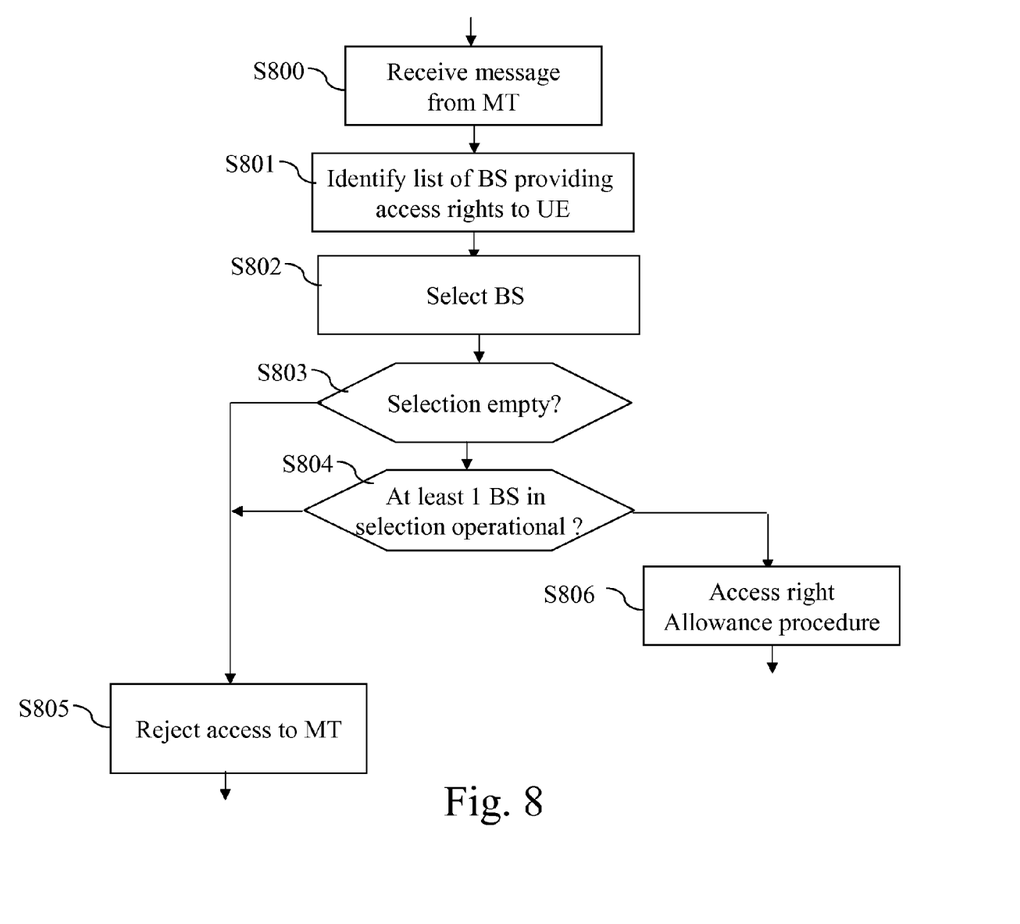
FIG. 8 discloses an example of an algorithm executed by a base station according to a third mode of realisation of the present invention.

The base station BS has, for example, an architecture based on components connected together by a bus 401 and a processor 400 controlled by the program as disclosed in the FIG. 7a or 8.

The bus 401 links the processor 400 to a read only memory ROM 402, a random access memory RAM 403, a wireless interface 405 and a network interface 406.

The memory 403 contains registers intended to receive variables and the instructions of the program related to the algorithm as disclosed in the FIG. 7a or 8.

The memory 303 may comprise information representative of the neighbouring conditions of the base station BS.

The processor 400 controls the operation of the network interface 406 and of the wireless interface 405. The network interface 406 and the wireless interface 405 are the resources used by a mobile terminal MT when the mobile terminal MT accesses to the wireless cellular telecommunication network through the base station BS.

The read only memory 402 contains instructions of the programs related to the algorithm as disclosed in the FIG. 7a or 8, which are transferred, when the base station BS is powered on, to the random access memory 403.

The base station BS may be connected to a telecommunication network through the network interface 406. For example, the network interface 406 is a DSL (Digital Subscriber Line) modem, or an ISDN (Integrated Services Digital Network) interface, etc. Through such interface, the base station BS may transfer messages to the core network device CN or to other base stations BS or may receive messages from other base stations BS or from the core network device CN.

FIG. 5 discloses an example of an algorithm executed by a mobile terminal according to the present invention.

More precisely, the present algorithm is executed by the processor 200 of the mobile terminal MT.

At step S500, the processor 200 gets a list of at least one base station BS through which the mobile terminal MT is allowed to use the resource of the base station BS in order to access to the wireless cellular telecommunication network. The list of at least one base station BS through which the mobile terminal MT has right to access to the wireless cellular telecommunication network is as example memorized in the RAM memory 203.

The list of at least one base station BS comprises at least one identifier of a base station BS and/or comprises information enabling the mobile terminal MT to synchronize on signals transferred by at least one base station BS.

At next step S501, the processor 200 commands the wireless interface 205 to proceed to some measurement of signals which may be transferred by at least one base station BS through which the mobile terminal MT is allowed to access to the wireless cellular telecommunication network. In other words and according to the example given in reference to the FIG. 1, the wireless interface 205 of mobile terminal MT detects if the base station BS1 is operational, i.e. transfers signals.

At next step S502, the processor 200 checks if the signals transferred by at least one base station BS through which the mobile terminal MT is allowed to access to the wireless cellular telecommunication network are upper than a predetermined threshold. In other words, the wireless interface 205 of the mobile terminal MT checks if signals transferred by the base station BS1 can be detected, i.e. if the base station BS1 is operational.

If the list of at least one base station BS comprises a single base station BS, the wireless interface 205 checks if that base station BS transfers signals.

If the list of at least one base station BS comprises plural base stations BS, the wireless interface 205 measures each signal that may be transferred by the base stations BS comprised in the list.

In a variant, the wireless interface 205 measures each signal transferred by the base station BS comprised in the list and which is the closest from the mobile terminal MT location, the mobile terminal MT location being determined for example by geo-location techniques as GNSS or radio fingerprint.

A radio fingerprint characterises the radio signals received in a given location. A radio fingerprint may be a list of base station identifiers or the result of measurements on signals received at a location. By comparing a fingerprint with fingerprints memorized in a database, it is possible to determine the location of the mobile terminal MT.

If the mobile terminal MT is close to the base station BS1 and if the signals transferred by the station BS1 through which the mobile terminal MT is allowed to access to the wireless cellular telecommunication network are not upper than the predetermined threshold, it means that the base station BS1 is not operational, the processor 200 moves to step S503.

If the signals transferred by one base station BS through which the mobile terminal MT is allowed to access to the wireless cellular telecommunication network are upper than the predetermined threshold, the processor 200 moves to step S510 and selects that base station BS as the base station BS through which the mobile terminal MT can access to the wireless cellular telecommunication network, i.e. through which the mobile terminal MT can establish or receive a communication.

After that, the processor 200 interrupts the present algorithm.

At step S503, the processor 200 commands the wireless interface 205 to proceed to some measurements of signals which may be transferred by at least one base station BS which is not identified to allow the mobile terminal MT to access to the wireless cellular telecommunication network through the base station BS. A base station BS which is not identified as a base station BS through which the mobile terminal MT can access to the wireless cellular telecommunication network is a base station BS to which the mobile terminal MT is not associated to.

In a variant, the steps S501 and 5503 are executed simultaneously. According to that variant, the processor 200 commands the wireless interface 205 to proceed to some measurements of signals which may be transferred by any base station BS.

From the measurements, the processor 200 determines at step S502 if there is at least one base station BS identified in the list of at least one base station BS which transfers signals measured at a level upper than the predetermined threshold.

If there is one base station BS identified in the list which transfers signals measured at a level upper than the predetermined threshold, the processor 200 moves to step S510.

Otherwise, the processor 200 moves to step S504.

At next step S504, the processor 200 selects a base station BS which is not identified as a base station BS through which the mobile terminal MT can access to the wireless cellular telecommunication network.

The processor 200 selects for example, the base station BS2 which transfers the signals which are received by the mobile terminal MT with the highest power strength among the measured signals and/or selects the base station BS2 which has the lowest working load and/or selects the base station BS2 which transfers the signals which are received by the mobile terminal MT with the highest quality.

At next step S505, the processor 200 commands the transfer of a message to the selected base station BS2.

The message is representative of a request to get the rights to use the resource of the base station BS2 in order to access to the wireless cellular telecommunication network.

The message may be also representative of a notification of the absence of the base station BS1 through which the mobile terminal MT is allowed to access to the wireless cellular telecommunication network.

The message may notify the fact that the base station BS1 through which the mobile terminal MT is allowed to access to the wireless cellular telecommunication network is not operational.

The message may or may not comprise information enabling the identification of the base station BS1 which is not operational.

At next step S506, the processor 200 checks if, in response to the message transferred at step S505, a message updating the access rights of the mobile terminal MT is received.

If a message updating the access rights of the mobile terminal MT is received, the processor 200 moves to step S507. Otherwise, the processor 200 interrupts the present algorithm.

At step S507, the processor 200 updates the list of at least one base station BS through which the mobile terminal MT is allowed to access to the wireless cellular telecommunication network and inserts the identifier of the base station BS2 selected at step S504 into the list.

It has to be noted here that the base station BS2 selected at step S504 may be inserted into the list for a limited period of time. The base station BS2 may also be inserted in the list with a priority indication, or with a flag reflecting that the base station BS2 is not part of the initial list of authorised base stations.

The selected base station BS2 is the base station BS2 through which the mobile terminal MT can establish or receive a communication with a remote telecommunication device and/or can download data and/or can notify to the core network device CN that a base station BS identified in its list of at least one base station is not operational and/or can request the core network device CN to wake up the base station BS which is not operational.

FIG. 6 discloses an example of an algorithm executed by a core network device according to a first mode of realisation of the present invention.

More precisely, the present algorithm is executed by the processor 300 of the core network device CN.

At step S600, the processor 300 detects the reception of a message transferred by a base station BS.

The message is transferred by a base station BS in response to the message transferred by the mobile terminal MT at step S505 of the FIG. 5.

According to the example given in reference to the FIG. 5, the message is transferred by the base station BS2.

The message may be representative of a request to get the rights to use the resource of the base station BS2 in order to get access to the wireless cellular telecommunication network.

The message may be also representative of a notification of the absence of a base station BS1 through which the mobile terminal MT is allowed to access to the wireless cellular telecommunication network.

The message may notify the fact that the base station BS1 through which the mobile terminal MT is allowed to access to the wireless cellular telecommunication network is not operational.

The message may or may not comprise information enabling the identification of the base station BS1 which is not operational.

At next step S601, the processor 300 identifies at least one base station BS through which the mobile terminal MT is allowed to access to the wireless cellular telecommunication network, i.e. at least one base station BS the mobile terminal MT is associated to.

The at least one base station BS the mobile terminal MT is associated to may be identified in the received message.

The at least one base station BS the mobile terminal MT is associated to may be identified using the identifier of the mobile terminal MT comprised in the received message as a key in a database comprising information identifying, for each mobile terminal MT, each base station BS through which the mobile terminal MT is allowed to access to the wireless cellular telecommunication network.

At next step S602, the processor 300 selects a list of base station BS which is a subset of the at least one base station BS the mobile terminal MT is associated to.

The list may be reduced to the base station BS1 through which the mobile terminal MT is allowed to access to the wireless cellular telecommunication network identified in the received message.

The processor 300 may select the base station or base stations BS by selecting among the at least one base station BS the mobile terminal MT is associated to, the base station or base stations BS which are neighbour from the base station BS2 which transferred the message received at step S600.

At next step S603, the processor 300 checks if the list of base station BS built at step S602 is empty.

If the list built at step S602 is empty, the processor 300 moves to step S605. Otherwise, the processor 300 moves to step S604.

At step S605, the processor 300 commands the transfer of a message to the base station BS2 which transferred the message received at step S600 which is representative of a rejection to give rights to the mobile terminal MT to use the resources of the base station BS2 in order to access to the wireless cellular telecommunication network.

After that, the processor 300 interrupts the present algorithm.

At step S604, the processor 300 checks if at least one base station BS in the list of base stations BS built at step S602 is operational.

The processor 300 may check if the base station or base stations BS in the list of base stations BS built at step S602 is or are operational by checking if the base station or base stations BS responds or respond to a message or signal transferred by the core network device CN.

The processor 300 may check if the base station or base stations BS in the list of base stations BS built at step S602 is or are operational by checking if the link S1 between that base station or these base stations BS and the core network device CN is operational.

If at least one base station BS in the list of base stations BS built at step S602 is operational, the processor 300 moves to step S605 already disclosed.

If none of the base stations BS in the list of base stations BS built at step S602 is operational, the processor 300 moves to step S606.

In variant, the processor 300 further checks at step S604, if a flag associated to the base station BS2 which sent the message received at step S600 authorises the base station BS2 to allow the access to the wireless cellular telecommunication network through the base station BS2 to mobile terminals MT which are not associated to the base station BS2.

The flag is for example set by the owner of the base station BS2 or is set according to the current load of the resources of the base station BS2.

If the flag associated to the base station BS2 which sent the message received at step S600 authorises the base station BS2 to allow the access by mobile terminals MT which are not associated to the base station BS2 to the wireless cellular telecommunication network through the base station BS2 and none of the base stations BS in the list of base stations BS built at step S602 is operational, the processor 300 moves to step S606.

If the flag associated to the base station BS2 which sent the message received at step S600 doesn't authorise the base station BS2 to allow the access by mobile terminals MT which are not associated to the base station BS2 to the wireless cellular telecommunication network through the base station BS2, the processor 300 moves to step S605.

At step S606, the processor 300 allows the base station BS2 which transferred the message received at step S600 to give access right to use the resources of the base station BS2 in order to access to the wireless cellular telecommunication network, i.e. allows the mobile terminal MT to establish or receive a communication with a remote telecommunication device.

The processor 300 updates the list of at least one base station BS through which the mobile terminal MT is allowed to access to the wireless cellular telecommunication network by including in the list, temporally or not, the base station BS2 which transferred the message received at step S600.

The base station BS2 may also be inserted in the list with a priority indication, or with a flag reflecting that the base station BS2 is not part of the initial list of at least one base station BS.

At next step S607, the processor 300 commands the transfer of a message to the base stations BS2 which transferred the message received at step S600 allowing the base station BS2 to give access right to use the resources of the base station BS2 in order to access to the wireless cellular telecommunication network.

Such allowance is temporary or not.

After that, the processor 300 interrupts the present algorithm.

FIG. 7a discloses an example of an algorithm executed by a base station according to a second mode of realisation of the present invention.

More precisely, the present algorithm is executed by the processor 400 of a base station BS.

At step S700, the processor 400 detects the reception of a message transferred by a mobile terminal MT.

The message is the message transferred by the mobile terminal MT at step S505 of the FIG. 5.

The message may be representative of a request to get the rights to use the resource of the base station BS2 in order to get access to the wireless cellular telecommunication network.

The message may be also representative of a notification of the absence of a base station BS1 through which the mobile terminal MT is allowed to access to the wireless cellular telecommunication network.

The message may notify the fact that the base station BS1 through which the mobile terminal MT is allowed to access to the wireless cellular telecommunication network is not operational.

The message may or may not comprise information enabling the identification of the base station BS1 which is not operational.

At next step S701, the processor 400 identifies at least one base station BS through which the mobile terminal MT is allowed to access to the wireless cellular telecommunication network, i.e. at least one base station BS, the mobile terminal MT is associated to.

The at least one base station BS the mobile terminal MT is associated to may be identified in the received message.

The at least one base station BS the mobile terminal MT is associated to may be identified using the identifier of the mobile terminal MT comprised in the received message as a key in a database comprising information identifying, for each mobile terminal MT, each base station BS through which the mobile terminal MT is allowed to access to the wireless cellular telecommunication network.

At next step S702, the processor 400 selects a list of base stations BS which is a subset of the at least one base station BS the mobile terminal MT is associated to.

The list may be reduced to the base station BS1 through which the mobile terminal MT is allowed to access to the wireless cellular telecommunication network identified in the received message.

The processor 400 may select the base station or base stations BS by selecting among the at least one base station BS the mobile terminal MT is associated to, the base station or base stations BS which are neighbour from the base station BS2.

At next step S703, the processor 400 checks if the list of base station BS built at step S702 is empty.

If the list built at step S702 is empty, the processor 400 moves to step S705. Otherwise, the processor 400 moves to step S704.

At step S705, the processor 400 commands the transfer of a message to the mobile terminal MT which transferred the message received at step S700 which is representative of a rejection to give rights to the mobile terminal MT to use the resources of the base station BS2 in order to access to the wireless cellular telecommunication network.

After that, the processor 400 interrupts the present algorithm.

At step S704, the processor 700 checks if at least one base station BS in the list of base stations BS built at step S702 is operational.

For each base station BS in the list built at step S702, the processor 400 may check if the base station BS through which the mobile terminal MT is allowed to access to the wireless cellular telecommunication network is operational by checking if the base station responds to a message or signal transferred by the base station BS2.

For each base station BS in the list built at step S702, the processor 400 may check if the base station BS through which the mobile terminal MT is allowed to access to the wireless cellular telecommunication network is operational by checking if the link X2 between the base station BS2 and the base station BS is operational.

For each base station BS in the list built at step S702, the processor 400 may check if the base station BS through which the mobile terminal MT is allowed to access to the wireless cellular telecommunication network is operational by checking if signals transferred by the base station BS through which the mobile terminal MT is allowed to access to the wireless cellular telecommunication network are detected by the wireless interface 405.

If at least one base station BS in the list of base stations BS built at step S702 is operational, the processor 300 moves to step S705 already disclosed.

If none of the base stations BS in the list of base stations BS built at step S702 is operational, the processor 400 moves to step S706.

In variant, the processor 400 further checks at step S704, if a flag associated to the base station BS2 authorises the base station BS2 to allow the access to the wireless cellular telecommunication network through the base station BS2 to mobile terminals MT which are not associated to the base station BS2.

The flag is for example set by the owner of the base station BS2 or is set according to the current load of the resources of the base station BS2.

If the flag associated to the base station BS2 authorises the base station BS2 to allow the access by mobile terminals MT which are not associated to the base station BS2 to the wireless cellular telecommunication network through the base station BS2 and none of the base stations BS in the list of base stations BS built at step S702 is operational, the processor 400 moves to step S706.

If the flag associated to the base station BS2 which sent the message received at step S700 doesn't authorise the base station BS2 to allow the access by mobile terminals MT which are not associated to the base station BS2 to the wireless cellular telecommunication network through the base station BS2, the processor 400 moves to step S705.

It has to be noted here that, in a variant, the step S704 is not executed by the processor 400 of the base station BS but is executed by the processor 300 of the core network device CN.

At step S706, the processor 400 commands the transfer to the core network device CN of a message requesting the core network device CN to allow the mobile terminal MT to use the resources of the base station BS2 in order to access to the wireless cellular telecommunication network.

At next step S707, the processor 400 checks if a message is received from the core network device CN allowing the mobile terminal MT to use the resources of the base station BS2 in order to access to the wireless cellular telecommunication network.

If a message is received from the core network device CN allowing the mobile terminal MT to use the resources of the base station BS2 in order to access to the wireless cellular telecommunication network, the processor 400 moves to step S708. Otherwise, the processor 400 moves to step S705.

At step S708, the processor 400 updates the list of at least one base station BS through which the mobile terminal MT is allowed to access to the wireless cellular telecommunication network by including in the list, temporally or not, the base station BS2.

The base station BS2 may also be inserted in the list with a priority indication, or with a flag reflecting that the base station BS2 is not part of the initial list of authorised base stations.

In a variant, the processor 400 receives from the core network device CN an updated list of at least one base station BS through which the mobile terminal MT is allowed to access to the wireless cellular telecommunication network.

The updated list is transferred to the mobile terminal MT.

After that, the processor 400 interrupts the present algorithm.

FIG. 7*b* discloses an example of an algorithm executed by a core network device according to the second mode of realisation of the present invention.

More precisely, the present algorithm is executed by the processor 300 of the core network device CN.

At step S750, the processor 300 detects the reception of a message transferred by a base station BS.

The message is the message transferred by the base station BS2 at step S706 of the FIG. 7*a*.

At next step S751, the processor 300 checks if the mobile terminal MT may be allowed to use the resources of the base station BS2 in order to access to the wireless cellular telecommunication network.

For example, the processor 400 checks if the mobile terminal MT may be allowed to use the resources of the base station BS2 in order to access to the wireless cellular telecommunication network by checking if a flag associated to the base station BS2 authorises the base station BS2 to allow the access to the wireless cellular telecommunication network through the base station BS2 to mobile terminals MT which are not associated to the base station BS2.

The flag is for example set by the owner of the base station BS2 or is set according to the current load of the resources of the base station BS2.

If the mobile terminal MT is allowed to use the resources of the base station BS2 in order to access to the wireless cellular telecommunication network, the processor 300 moves to step S753. Otherwise, the processor 300 moves to step S752.

It has to be noted here that the step S751 may be replaced by a check if the base station BS1 through which the mobile terminal MT is allowed to access to the wireless cellular telecommunication network is operational or not.

If the base station BS1 through which the mobile terminal MT is allowed to access to the wireless cellular telecommunication network is operational, the processor 300 moves to step S752. Otherwise, the processor 300 moves to step S753.

At step S752, the processor 300 commands the transfer of a message rejecting the mobile terminal MT to access to the wireless cellular telecommunication network through the base station BS2.

After that, the processor 300 interrupts the present algorithm.

At step S753, the processor 300 commands the transfer of a message allowing the mobile terminal MT to access to the resources of the base station BS in order to access to the wireless cellular telecommunication network.

In a variant, the processor 300 updates the list of at least one base station BS through which the mobile terminal MT is allowed to access to the wireless cellular telecommunication network by including temporally or not the base station BS2 in the list and transfers the list to the base station BS2 which transferred the message received at step S750.

After that, the processor 300 interrupts the present algorithm.

FIG. 8 discloses an example of an algorithm executed by a base station according to a third mode of realisation of the present invention.

More precisely, the present algorithm is executed by the processor 400 of a base station BS.

At step S800, the processor 400 detects the reception of a message transferred by a mobile terminal MT.

The message is the message transferred by the mobile terminal MT at step S505 of the FIG. 5 and is as disclosed at step S700 of the FIG. 7*a*.

At next step S801, the processor 400 identifies, as disclosed at step S701 of the FIG. 7*a*, at least one base station BS through which the mobile terminal MT is allowed to access to the wireless cellular telecommunication network, i.e. at least one base station BS, the mobile terminal MT is associated to.

At next step S802, the processor 400 selects, as disclosed at step S702 of the FIG. 7*a*, a list of base stations BS which is a subset of the at least one base station BS the mobile terminal MT is associated to.

At next step S803, the processor 400 checks if the list of base stations BS built at step S802 is empty.

If the list built at step S802 is empty, the processor 400 moves to step S805. Otherwise, the processor 400 moves to step S804.

At step S805, the processor 400 commands the transfer of a message to the mobile terminal MT which transferred the message received at step S800 which is representative of a rejection to give rights to the mobile terminal MT to use the resources of the base station BS2 in order to access to the wireless cellular telecommunication network.

After that, the processor 400 interrupts the present algorithm.

At step S804, the processor 700 checks, as disclosed at step S704 of the FIG. 7*a*, if at least one base station BS in the list of base stations BS built at step S802 is operational.

If at least one base station BS in the list of base stations BS built at step S802 is operational, the processor 300 moves to step S805 already disclosed.

If none of the base stations BS in the list of base stations BS built at step S802 is operational, the processor 400 moves to step S806.

In variant, the processor 400 further checks at step S804, if a flag associated to the base station BS2 authorises the base station BS2 to allow the access to the wireless cellular telecommunication network through the base station BS2 to mobile terminals MT which are not associated to the base station BS2.

The flag is for example set by the owner of the base station BS2 or is set according to the current load of the resources of the base station BS2.

If the flag associated to the base station BS2 authorises the base station BS2 to allow the access by mobile terminals MT which are not associated to the base station BS2 to the wireless cellular telecommunication network through the base station BS2 and none of the base stations BS in the list of base stations BS built at step S802 is operational, the processor 400 moves to step S806.

If the flag associated to the base station BS2 which sent the message received at step S800 doesn't authorise the base station BS2 to allow the access by mobile terminals MT which are not associated to the base station BS2 to the wireless cellular telecommunication network through the base station BS2, the processor 400 moves to step S805.

At step S806, the processor 400 commands the transfer to the mobile terminal MT of a message allowing the mobile terminal MT to use the resources of the base station BS2 in order to access to the wireless cellular telecommunication network.

The message comprises the identifier of the base station BS2 or is an updated list of at least one base station BS through which the mobile terminal MT is allowed to access to the wireless cellular telecommunication network.

The updated list comprises the identifier of the base station BS2.

After that, the processor 400 interrupts the present algorithm.

Naturally, many modifications can be made to the embodiments of the invention described above without departing from the scope of the present invention.

The invention claimed is:

1. A method for enabling a mobile terminal to access to a wireless cellular telecommunication network including plural base stations, the mobile terminal having right to access to the wireless cellular telecommunication network through a first base station, the mobile terminal having no right to access to the wireless cellular telecommunication network through a second base station, the method comprising:

detecting reception of a first message transferred by the mobile terminal to the second base station;

verifying a plurality of conditions for the granting to the mobile terminal of the right to access to the wireless cellular telecommunication network through the second base station, the plurality of conditions comprising at least one condition relative to the first and/or the second base station, and at least one condition relative to the mobile terminal, one condition of the plurality of conditions relative to the first and/or the second base station consisting in verifying that the first base station is operational;

giving right to the mobile terminal to access to the wireless cellular telecommunication network through the second base station if all conditions of said plurality of conditions are verified; and rejecting right to the mobile terminal to access to the wireless cellular telecommunication network through the second base station if at least one condition of said plurality of conditions is not verified.

2. The method according to claim 1, wherein one condition of the plurality of conditions relative to the first and/or the second base station consists in verifying that the second base station is in a vicinity of the first base station.

3. The method according to claim 1, wherein the right to access to the wireless cellular telecommunication network through the second base station is given to the mobile terminal for a limited period of time and one condition of the plurality of conditions relative to the mobile terminal consists in verifying that a current time is in the limited period of time given to the mobile terminal.

4. The method according to claim 1, wherein the mobile terminal is able to access to the wireless cellular telecommunication network through plural first base stations, and the method further comprising:

determining which of the first base station of the plural first base stations is a non-operational base station, said non-operational base station of the plural base stations being determined by reading information identifying said non-operational base station of the plural base stations in a second message received from the second base station or by using information representative of a vicinity between the non-operational base station of the plural first base station and the second base station to which is transferred the first message.

5. The method according to claim 1, wherein the wireless cellular telecommunication network includes a core network device and the method is executed by the core network device.

6. The method according to claim 1, wherein the method is executed by the second base station.

7. A non-transitory computer readable medium, comprising computer executable instructions or portions of code for implementing the method according to claim 1, when the computer executable instructions are executed on a programmable device.

8. A device for enabling a mobile terminal to access to a wireless cellular telecommunication network including plural base stations, the mobile terminal having right to access to the wireless cellular telecommunication network through a first base station, the mobile terminal having no right to access to the wireless cellular telecommunication network through a second base station, the device for enabling a mobile terminal to access to a wireless cellular telecommunication network comprising:

means for detecting reception of a first message transferred by the mobile terminal to the second base station;

means for determining if the first base station is operational;

means for verifying a plurality of conditions for the granting to the mobile terminal of the right to access to the wireless cellular telecommunication network through the second base station, the plurality of conditions comprising at least one condition relative to the first and/or the second base station, and at least one condition relative to the mobile terminal;

means for giving right to the mobile terminal to access to the wireless cellular telecommunication network through the second base station if all conditions of said plurality of conditions are verified; and means for rejecting right to the mobile terminal to access to the wireless cellular telecommunication network through the second base station if at least one condition of said plurality of conditions is not verified.

9. A device for enabling a mobile terminal to access to a wireless cellular telecommunication network including plural base stations, the mobile terminal having right to access to the wireless cellular telecommunication network through a first base station, the mobile terminal having no right to access to the wireless cellular telecommunication network through a second base station, the device for enabling a mobile terminal to access to a wireless cellular telecommunication network comprising:

a receiver that detecting reception of a first message transferred by the mobile terminal to the second base station and determines if the first base station is operational;

a condition verification section that verifies a plurality of conditions for the granting to the mobile terminal of the right to access to the wireless cellular telecommunication network through the second base station, the plurality of conditions including at least one condition relative to the first and/or the second base station, and at least one condition relative to the mobile terminal;

an access granting section that grants a right to the mobile terminal to access the wireless cellular telecommunication network through the second base station if all conditions of said plurality of conditions are verified; and an access rejecting section that rejects a right of the mobile terminal to access the wireless cellular telecommunication network through the second base station if at least one condition of said plurality of conditions is not verified.

* * * * *